UNITED STATES PATENT OFFICE.

ALBERT CARON, OF HAUS ELLENBACH, GERMANY, ASSIGNOR TO THE FARBENFABRIKEN OF ELBERFELD CO., OF NEW YORK.

PROCESS OF FERTILIZING AGRICULTURAL CROPS.

SPECIFICATION forming part of Letters Patent No. 679,601, dated July 30, 1901.

Application filed October 26, 1897. Serial No. 656,405. (No specimens.)

*To all whom it may concern:*

Be it known that I, ALBERT CARON, a subject of the Emperor of Germany, residing at Haus Ellenbach, near Bettenhausen, Germany, have invented a certain new and useful Improvement in Processes of Fertilizing Agricultural Crops, (for which I have already obtained Letters Patent in Germany, No. 97,970, dated February 10, 1897; in France, No. 264,866, and in Belgium, No. 126,887, both dated March 10, 1897, and in Hungary, No. 9,229, dated May 5, 1897,) of which the following is a clear and exact description.

It is known that certain bacteria existing in the nodules on the roots of leguminous plants furnish inoculating material which could be applied as nitrogenous manuring for leguminous plants; but bacteria which could be used for inoculating other crops have been unknown up to the present.

I have now found that pure cultivations of certain species of the numerous bacteria contained in the soil possess to a high degree the property of assimilating the nitrogen of the air and at the same time of transforming those nitrogen compounds contained in the soil which cannot be assimilated by the plants into such as are readily assimilated by the agricultural crops, thus fertilizing the inoculated ground for the growth of any agricultural crops, especially of cereals. The inoculation of the soil with these new cultures renders the application of natural or artificial nitrogenous fertilizer unnecessary. Among these bacteria I have discovered one species which is of special value and which I have termed *Bacillus ellenbachensis alpha.* It has the following properties: It is a middle-sized self-moving little rod-shaped bacterium. Sometimes these little rods are in the form of long chains. The bacillus is of the class bearing endogenous resting-spores, which class is most capable of resisting injurious influences. If one of these bacteria be put on a gelatin plate, it first develops to little roundish granulous colonies, which by and by branch out into the gelatin, and then these little colonies increase in size and become surrounded by a dark corona of rays. Finally the gelatin begins to liquefy, and this liquefaction proceeds very quickly. On developing on potatoes the bacteria form a dull thick yellowish-white layer, which is jagged in a characteristic manner. The layer formed on agar-agar is darker and brighter than that on potatoes. It bears a "pitted" appearance. If a culture broth be inoculated with the bacillus in question, it gets cloudy after a few days, and subsequently a whitish moldy film is formed on the liquid, while a yellowish-gray sediment is separated. After stirring the liquid the whole mold separates in the form of a sediment, a film being no longer formed.

The inoculation of the soil to be fertilized with the *Bacillus ellenbachensis alpha* may be carried out as follows:

First. The bacteria may be used in a dry state. The best method is to mix the dry bacteria either with particles of the soil or with artificial fertilizer or with nutritive substances on which the bacillus can develop and to sow these mixtures on the fields in an even manner. Of course the dry bacteria can also be mixed with indifferent substances, such as gypsum or the like, and the thus-formed powder can be disseminated before or after the sowing of the cereals.

Second. It is, however, more advantageous to use the bacteria in a wet state, which may be done as follows: The bacteria developed on gelatin, in broth, or in other culture media are suspended in a small quantity of water, and this liquid is poured over the seed-corn. The latter is stirred up, and thus being thoroughly inoculated with the bacteria it is sown in the usual manner. Naturally one can also inoculate the indifferent substances above referred to or the artificial fertilizer with bacteria suspended in water and after stirring well bring the resulting mixture on the soil.

A soil being thoroughly inoculated with the bacteria according to one of the above methods or in any other manner yielding the same result does not require any artificial fertilizer containing nitrogen, and, nevertheless, yields a very good harvest.

The so-called *Bacillus ellenbachensis alpha*, when incorporated into the soil multiplies at first by millions, but afterward disappears to the extent to which the plant develops.

The above-described process for inoculating the soil with the so-called *Bacillus ellen-*

*bachensis alpha* is of the greatest importance for agriculture, especially for the production of cereals.

For a rapid development of the bacteria it is also advisable to add a carbohydrate—for example, grape-sugar—to the suspension of the cultivations of the bacteria in water.

Having thus described my invention, what I claim as new, and desire to secure by Letters Patent, is—

1. The process for inoculating soil to be fertilized for any agricultural crop consisting in mixing the soil with cultivations of the *Bacillus ellenbachensis alpha*, substantially as described.

2. The process of inoculating soil to be fertilized for any agricultural crop consisting in suspending cultivations of the *Bacillus ellenbachensis alpha* in water, mixing the thus-obtained liquid with the seed-grain and sowing the seed-grain into the soil, substantially as described.

In testimony whereof I have signed my name in the presence of two subscribing witnesses.

ALBERT CARON.

Witnesses:
GEORG WEINREICH,
LUDWIG SCHIEBELER.